United States Patent [19]
Krawitt

[11] 3,889,656
[45] June 17, 1975

[54] METHOD OF DETERMINING THE PRESENCE OF CALCULI IN BODY CAVITIES

[75] Inventor: Donald R. Krawitt, Rye, N.Y.

[73] Assignee: Mount Sinai School of Medicine of the City University of New York, New York, N.Y.

[22] Filed: Mar. 19, 1974

[21] Appl. No.: 452,633

Related U.S. Application Data

[62] Division of Ser. No. 223,184, Feb. 3, 1972, Pat. No. 3,809,066.

[52] U.S. Cl. .................................. 128/2 R; 128/7
[51] Int. Cl. .............................................. A61b 5/06
[58] Field of Search ............... 128/2 R, 2 L, 4, 5, 6, 128/7, 8, 9, 395

[56] References Cited
UNITED STATES PATENTS

| | | | |
|---|---|---|---|
| 2,616,415 | 11/1952 | Kirby et al. | 128/2 R |
| 2,652,825 | 9/1953 | Rauh et al. | 128/2 R |
| 3,068,742 | 12/1962 | Hicks, Jr. | 128/397 X |

*Primary Examiner*—Kyle L. Howell
*Attorney, Agent, or Firm*—Brumbaugh, Graves, Donohue & Raymond

[57] ABSTRACT

A method for detecting the presence of kidney stones, gallstones and the like in situ within a body cavity. The device for carrying out the method includes a fiber optic light conducting probe, the free end of which is introduced into a duct leading to the suspected cavity. Where the free end contacts tissue or organic matter, light emanating from the tip of the probe is diffused into the material. However, where the free end contacts inorganic material, the light is not diffused, but is reflected back through the probe to be sensed at the opposite end thereof, thus giving an indication of the presence of such material.

1 Claim, 4 Drawing Figures

METHOD OF DETERMINING THE PRESENCE OF CALCULI IN BODY CAVITIES

This application is a divisional application of Ser. No. 223,184, filed Feb. 3, 1972, now U.S. Pat. No. 3,809,066.

This invention relates generally to the field of internal medicine, and more particularly to a method for detecting the presence of calculi in the form of stones in various organs. More particularly, the invention relates to a method which may be readily utilized by those having little or no training in radiology, and which permits a diagnosis to be obtained within a relatively short period of time.

DESCRIPTION OF THE PRIOR ART

Kidney and gallstones have traditionally been detected by resort to radiology, either by the taking of x-ray films or fluoroscopy. While such procedures, when properly used, are very accurate, both films and fluoroscope techniques have very obvious disadvantages. In the case of x-ray filming, the effect of radiation is lessened, but considerable skill is required in the taking of the x-ray photographs. A period of time is lost during which the films are processed, and following this, the reading of the processed films requires knowledge and skill not possessed by all members of the medical profession. In the case of fluoroscopy, the danger of radiation is substantially greater, although diagnosis may be obtained instantaneously.

BRIEF SUMMARY OF THE INVENTION

Briefly stated, the invention contemplates the sensing of the presence of inorganic material within the body by utilization of the fact that collimated light is readily diffused within tissue and organic material present within a body cavity, and is not diffused by inorganic material. The invention contemplates the provision of a fiber optic probe of diameter sufficiently small to permit its insertion through ducts leading to suspected organs, so that the end of the probe may contact material present within the organ to transmit light to the surface of such material. Light is introduced at the outer end of the probe, and the presence of reflected light above a threshhold level is sensed externally of the cavity to indicate the presence of a stone or other foreign body.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
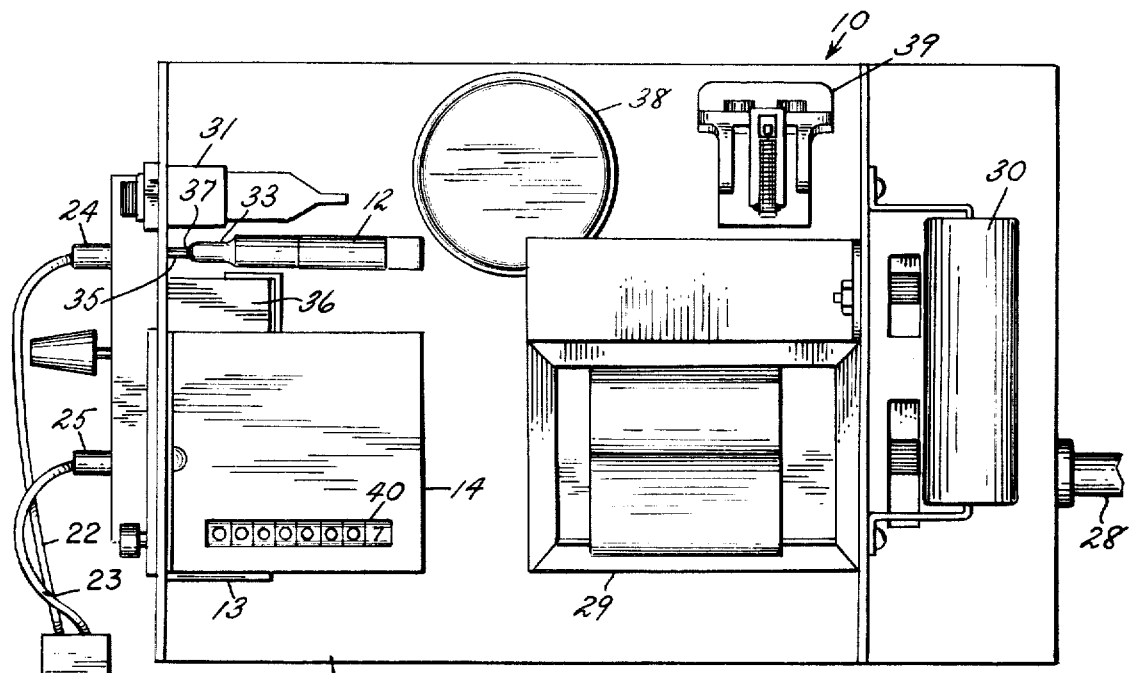
FIG. 1 is a schematic, fragmentary top plan view of an embodiment of the invention.

In accordance with the invention, the device, generally indicated by reference character 10, for use in the method comprises broadly: a fiber optic probe element 11, light source means 12, light sensing means 13 and signal means 14.

Figure 2:
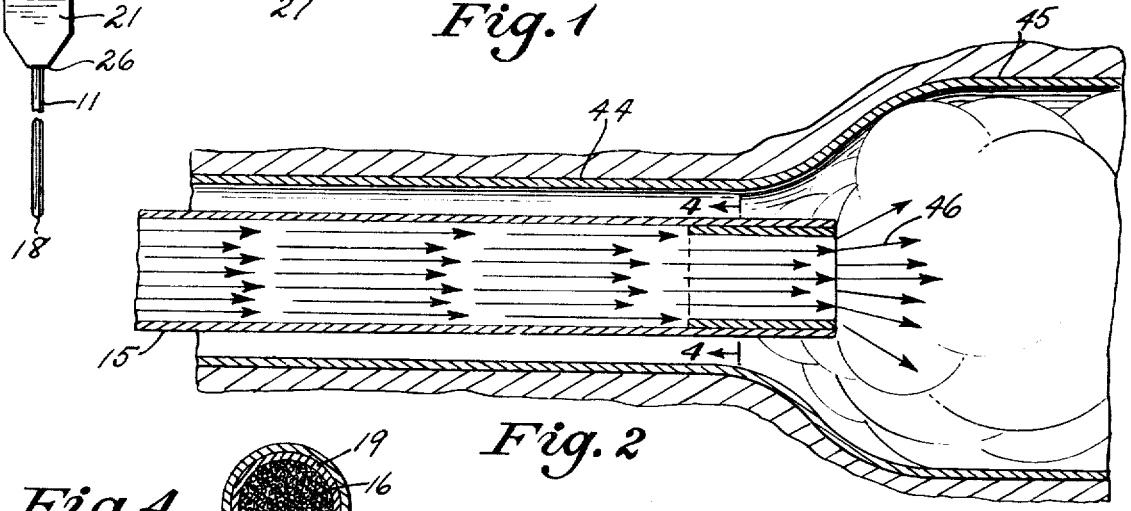
FIG. 2 is a schematic, fragmentary view showing the insertion of a probe element forming a part of the embodiment within a body cavity.
Figure 4:
FIG. 4 is a sectional view as seen from the plane 4—4 in FIG. 2.

The probe element 11 includes a continuous length of fiber optic cable 15 formed of a plurality of light fibers 16 (FIGS. 2 and 4). These are covered by a synthetic resinous sheath 17, the outer surface of which is capable of producing little friction. A free end 18 is provided with a metal ferrule 19 to hold the ends of the fibers 16 in close proximity. An opposite end 26 terminates in a bifurcating terminal 21 from which extend first and second conductors 22 and 23, respectively, each having the outer segments of substantially half of the fibers 16. The conductors 22–33 terminate in pin terminals 24 and 25, respectively.

The means 12–14, inclusive, are most conveniently mounted on a small electronic chassis 27 which includes a power cord 28, a transformer 29, a large resistor 30 and a main power switch 31.

The light source means 12 includes a small incandescent lamp 33 mounted upon the chassis 27 of a type having a meniscus focusing lens 34 at a free end thereof which directs light into a collimating tube 35 leading to the conductor 22. The lamp 33 is powered by a low voltage tap (not shown) of the transformer 29.

The means 13 includes a cadmium sulphide light sensitive resistive means 36 also mounted on the chassis 27 connected in series with a variable resistance sensitivity control, and is adapted to operate on very low voltage. The voltage used to operate the lamp 37 is passed through the resistor 30 to obtain this voltage. As seen in FIG. 1, the member 36 is positioned to sense light emanating from the second conductor 23, and cause current to flow to a condensor 38 which stores energy up to a threshhold level. Upon reaching this level, the condensor is discharged to operate a relay switch 39 causing current to flow from the transformer 29 to operate the signal means 14.

The signal means 14 may be in the form of a small electric counter 40, and may include auxiliary buzzer or light means (not shown). The counter 40 permits actuation at relatively low light levels, and permits the rechecking of a sensed body a number of times to verify a diagnosis.

Figure 3:
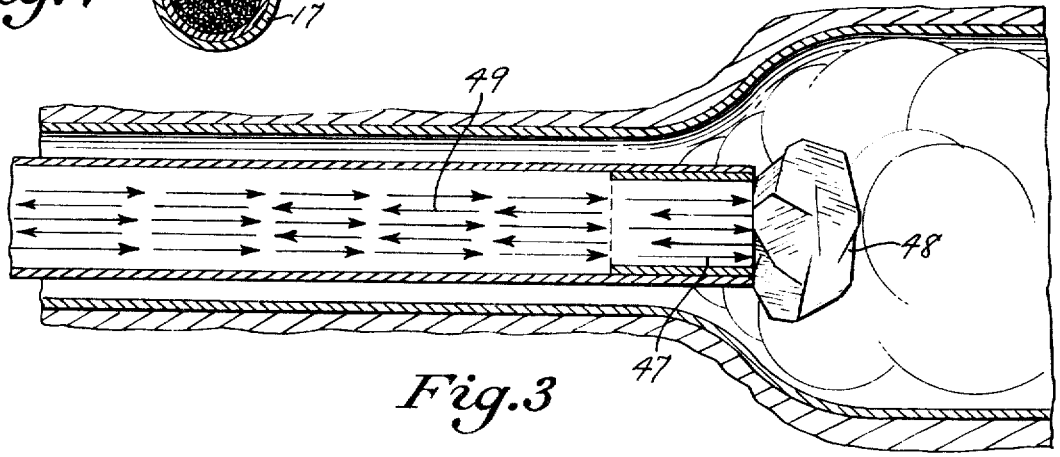
FIG. 3 is a similar fragmentary, schematic view, corresponding to that seen in FIG. 2, but showing the detection of an organic body within the cavity.

Operation of the device is relatively simple. The free end 18 of the probe element is introduced into the body of the patient in a manner similar to that employed in the introduction of a catheter. The probe travels through a duct 44 into the organ 45 being examined. Where, as shown in FIG. 2, the free end of the probe strikes only tissue or other organic matter, the light rays 46 are diffused into the tissue, and no light returns down the length of the probe. As seen in FIG. 3, where the out-going light rays 47 strike the surface of inorganic material 48, no diffusion occurs, and the light rays are reflected off the surface of the inorganic material and return as indicated by reference character 49 down other of the fibers 16 to be sensed by the means 13. Very often, the stone will be sufficiently small that several probing actions are necessary, and repeated actions will not necessarily contact the stone each time. In such cases, when a direct contact is obtained, the step counter 40 will advance one digit, giving the indication of the possible presence of a stone, and repeated probings will cause further advancement of the counter verifying this condition.

The diagnosis obtained by the above procedure can, of course, be confirmed by radiology, which will specifically locate the stone. However, the above procedure can be conveniently and safely conducted within the physician's office, even by physicians having little or no training in radiology, permitting a decision to be made as to whether or not the patient should be hospitalized.

I wish it to be understood that I do not consider the invention limited to the precise details of structure shown and set forth in this specification, for obvious modifications will occur to those skilled in the art to which the invention pertains.

I claim:

1. The method of determining the presence of agglomerated calculi in body cavities comprising the steps of: providing a light-conductive fiber optic probe having a first end suitable for insertion into said cavity, said probe having first and second groups of optical fibers having first terminals in mutually juxtaposed position at one end of said probe, and second and third terminals in mutually spaced position at an opposite end thereof; introducing a beam of collimated light to said second terminal for conduction to said first terminal, introducing said first terminal into said cavity, manually manipulating the end of said first terminal within said cavity substantially along the axis of said probe to contact possibly present particles of calculi, and observing quantitative changes in the intensity of light reflected back through said probe at said third terminal when said first terminal contacts agglomerated calculi.

* * * * *

UNITED STATES PATENT AND TRADEMARK OFFICE
CERTIFICATE OF CORRECTION

PATENT NO. : 3,889,656
DATED : June 17, 1975
INVENTOR(S) : DONALD R. KRAWITT

It is certified that error appears in the above-identified patent and that said Letters Patent are hereby corrected as shown below:

Col. 2, line 21, "34" should read --37--; and

Col. 2, line 29, "37" should read --33--.

Signed and Sealed this third Day of February 1976

[SEAL]

Attest:

RUTH C. MASON
Attesting Officer

C. MARSHALL DANN
Commissioner of Patents and Trademarks